United States Patent
Ito et al.

(10) Patent No.: US 6,329,787 B1
(45) Date of Patent: Dec. 11, 2001

(54) RECEPTION SYSTEM, BATTERY CHARGING DEVICE, PORTABLE INFORMATION TERMINAL, AND TRANSMISSION AND RECEPTION SYSTEM

(75) Inventors: Takeshi Ito; Eiji Kawai, both of Tokyo (JP)

(73) Assignee: Sony Computer Entertainment, Inc., Tokyo (JP)

(*) Notice: Subject to any disclaimer, the term of this patent is extended or adjusted under 35 U.S.C. 154(b) by 0 days.

(21) Appl. No.: 09/563,213

(22) Filed: May 2, 2000

(30) Foreign Application Priority Data

May 20, 1999 (JP) .................................................. 11-140747

(51) Int. Cl.[7] ........................................................ H02J 7/00
(52) U.S. Cl. ............................................................. 320/114
(58) Field of Search ..................................... 320/114, 132, 320/134; 455/11.1, 127, 575, 567, 569

(56) References Cited

U.S. PATENT DOCUMENTS

| | | | |
|---|---|---|---|
| 3,794,941 | * | 2/1974 | Templin ............................... 333/17.1 |
| 4,441,098 | * | 4/1984 | Borras et al. ........................... 341/20 |
| 5,367,556 | * | 11/1994 | Marui et al. ........................... 455/569 |
| 5,371,858 | | 12/1994 | Miller et al. ........................... 709/222 |
| 5,511,240 | * | 4/1996 | Nishiyama ............................. 455/127 |
| 5,754,962 | * | 5/1998 | Griffin ................................... 455/569 |
| 5,870,615 | * | 2/1999 | Bar-On et al. ........................ 713/310 |
| 5,978,569 | * | 11/1999 | Traeger ................................. 709/244 |
| 6,041,242 | * | 3/2000 | Coulthard ............................. 455/575 |
| 6,047,160 | * | 4/2000 | Priest et al. ........................... 455/11.1 |
| 6,052,603 | * | 4/2000 | Kinzalow et al. .................... 455/557 |

FOREIGN PATENT DOCUMENTS

| | | |
|---|---|---|
| 0658863 A2 | 6/1995 | (GB) . |
| 0889659 A2 | 1/1999 | (GB) . |
| 9-297774 | 11/1997 | (JP) . |
| 11-68994 | 3/1999 | (JP) . |

* cited by examiner

*Primary Examiner*—Peter S. Wong
*Assistant Examiner*—Pia Tibbits
(74) *Attorney, Agent, or Firm*—Rosenman & Colin, LLP

(57) ABSTRACT

Data can be received by a battery charging device while a portable information terminal powered by a secondary battery is connected to the battery charging device to charge the secondary battery. For data reception, the battery charging device has a tuner as a data reception circuit. While the portable information terminal is mounted in the battery charging device, the secondary battery is charged by the battery charging device, and the tuner receives a television wave containing a data broadcast. Data multiplexed in a video signal outputted from the tuner is decoded by a data decoding circuit, and stored into a data storage device of the portable information terminal. The data stored in the data storage device can be reproduced on a liquid crystal display unit of the portable information terminal when it is detached from the battery charging device.

13 Claims, 12 Drawing Sheets

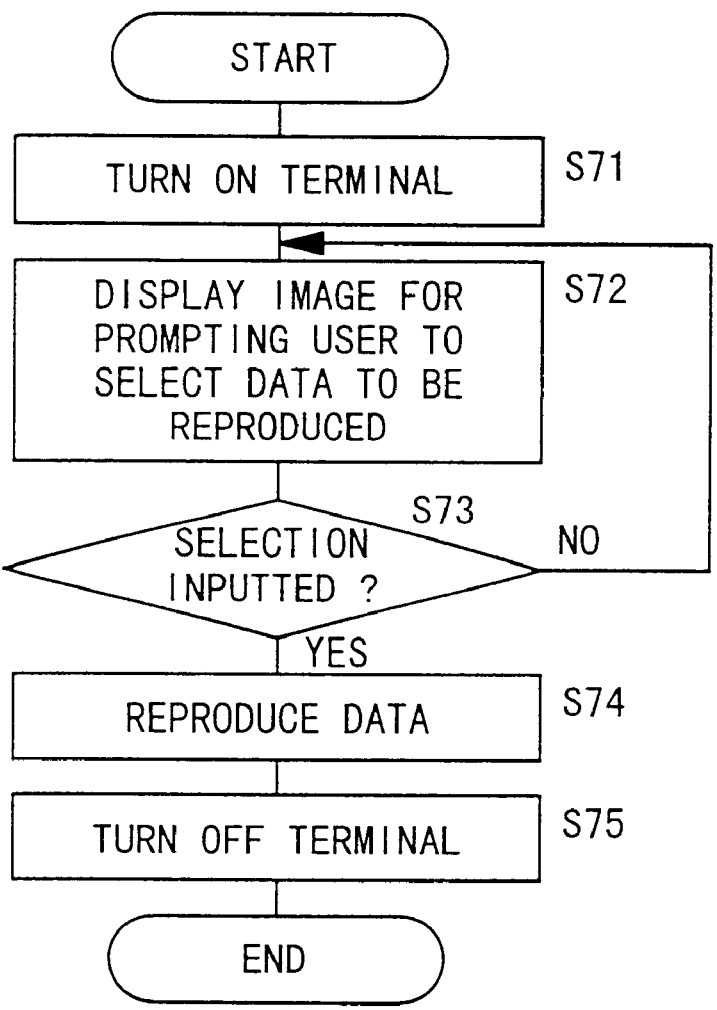

RECEPTION SYSTEM, BATTERY CHARGING DEVICE, PORTABLE INFORMATION TERMINAL, AND TRANSMISSION AND RECEPTION SYSTEM

BACKGROUND OF THE INVENTION

1. Field of the Invention

The present invention relates to a portable information terminal powered by a secondary battery, such as a portable telephone set, a PHS (Personal Handy-phone System) terminal, a PDA (Personal Digital Assistant—portable information communication terminal), a portable game machine, etc., a battery charging device for charging the secondary battery of such a portable information terminal, and a reception system and a transmission and reception system which employ the portable information terminal and the battery charging device.

2. Description of the Related Art

Various proposals have been made in order for a portable information terminal to transmit data to and receive data from an external circuit. According to a first attempt, the portable information terminal may have a built-in data transmission and reception circuit. According to a second scheme, the portable information terminal may be connected to a data transmission and reception device via a connection cable.

However, the first proposal is disadvantageous in that the portable information terminal has a relatively large volume and weight because the area of a printed wiring board which supports the data transmission and reception circuit is increased and the portable information terminal needs to accommodate circuit components of the data transmission and reception circuit, the portable information terminal has an increased power requirement, and the portability of the portable information terminal is impaired.

The second approach is able to overcome the shortcomings of the first proposal, but is problematic in that the data transmission and reception device needs to be provided as an individual device, and the process of connecting and disconnecting the connection cable is tedious and time-consuming.

The inventor of the present invention has noticed that many portable information terminals are powered by a secondary battery in view of its convenience, and such portable information terminals are normally used in such a mode that they are carried and used by the users in daytime, and connected to a battery charger to charge the secondary battery at night.

SUMMARY OF THE INVENTION

It is therefore an object of the present invention to provide a portable information terminal which is capable of receiving data and/or transmitting data without any built-in data reception circuit or data transmission and reception circuit.

Another object of the present invention is to provide a battery charging device for charging a secondary battery of such a portable information terminal, the battery charging device having an additional function of high added value in relation to the portable information terminal.

Still another object of the present invention is to provide a reception system and a transmission and reception system which have such a portable information terminal and a battery charging device having an additional function of high added value in relation to the portable information terminal.

According to the present invention, there is provided a reception system comprising a portable information terminal having a secondary battery, an external interface, and a memory, and a battery charging device for charging the secondary battery, the battery charging device having a data reception circuit for receiving data supplied from an external circuit, the arrangement being such that when the portable information terminal and the battery charging device are connected to each other, the secondary battery is charged by the battery charging device, and data received from the external circuit by the data reception circuit is stored into the memory of the portable information terminal via the external interface.

With the above arrangement, the portable information terminal which has no data reception circuit can receive data. Since the data reception circuit is incorporated in the battery charging device, no separate data reception device needs to be specially provided. The data received from the external circuit may comprise data via a data broadcast.

The portable information terminal may have a display unit for displaying the data stored in the memory.

If the data received from the external circuit comprises data via a data broadcast, then the display unit may display characters and images. The data can be displayed on the display unit while the portable information terminal is detached from the battery charging device and carried around by the user. If the portable information terminal has a sound output device in addition to the display unit, then the user can listen sounds outputted from the sound output device in synchronism with or independently of displayed portable information terminal.

If the data is supplied from the external circuit to the data reception circuit in a plurality of channels, then the battery charging device or the portable information terminal may have a channel selection circuit for selecting one of the plurality of channels.

A battery charging device according to the present invention comprises a charging terminal for connection to a portable information terminal powered by a secondary battery, a data reception circuit for receiving data supplied from an external circuit, and a reception controller for controlling the data reception circuit to receive data supplied from the external circuit when the portable information terminal is connected to the charging terminal.

Data received from the external circuit while the secondary battery is being charged can be sent to the portable information terminal while the secondary battery is being charged.

If the data is supplied from the external circuit to the data reception circuit in a plurality of channels, then the battery charging device may further comprise a channel selection circuit for selecting one of the plurality of channels.

According to the present invention, there is also provided a portable information terminal having a secondary battery, which is connectable to a battery charging device having a data reception circuit for receiving data supplied from an external circuit, comprising a memory for storing data, and an external interface for introducing the data, the arrangement being such that when the portable information terminal is connected to the battery charging device to charge the secondary battery, data received from the external circuit by the data reception circuit is stored into the memory via the external interface.

Consequently, the portable information terminal with no data reception circuit is capable of receiving data from the external circuit.

If the data is supplied from the external circuit to the data reception circuit in a plurality of channels, then the portable information terminal may have a channel selection circuit for selecting one of the plurality of channels.

The portable information terminal may further comprise a display unit for displaying the data stored in the memory.

A transmission and reception system according to the present invention comprises a battery charging device having a data transmission and reception circuit for transmitting data to and receiving data from an external circuit, and a first memory, and a portable information device having a secondary battery, an external interface, and a second memory, the arrangement being such that when the portable information terminal and the battery charging device are connected to each other, the secondary battery is charged by the battery charging device, and data received from the external circuit by the data reception circuit is stored into the second memory via the external interface, and when the portable information terminal and the battery charging device are connected to each other, data read from the first memory and/or the second memory is transmitted via the data transmission and reception circuit to the external circuit.

With the above arrangement, the battery charging device can transmit and receive data relative to the portable information terminal. The data relative to the portable information terminal may comprise audience data relative to the reception of a data broadcast.

When the portable information terminal is detached from the battery charging device, a display unit of the portable information terminal may display the data stored in the second memory.

If the data is supplied from the external circuit in a plurality of channels, then the battery charging device or the portable information terminal of the transmission and reception system may have a channel selection circuit for selecting one of the plurality of channels.

A battery charging device according to the present invention comprises a charging terminal for connection to a portable information terminal powered by a secondary battery, a data transmission and reception circuit for transmitting data to and receiving data from an external circuit, and a transmission and reception controller for controlling the data transmission and reception circuit to receive data supplied from the external circuit and transmit data supplied from the portable information terminal and/or data from within the battery charging device to the external circuit when the portable information terminal is connected to the charging terminal.

Consequently, the portable information terminal with no data transmission and reception circuit is capable of transmitting and receiving data. If the data is supplied from the external circuit to the data reception circuit in a plurality of channels, then the battery charging device or the portable information terminal has a channel selection circuit for selecting one of the plurality of channels.

The above and other objects, features, and advantages of the present invention will become more apparent from the following description when taken in conjunction with the accompanying drawings in which preferred embodiments of the present invention are shown by way of illustrative example.

BRIEF DESCRIPTION OF THE DRAWINGS

FIG. 12 is a flowchart of an operation sequence of the data reception system shown in FIGS. 8 and 9 when a portable information terminal singly operates.

DESCRIPTION OF THE PREFERRED EMBODIMENTS

Figure 1:
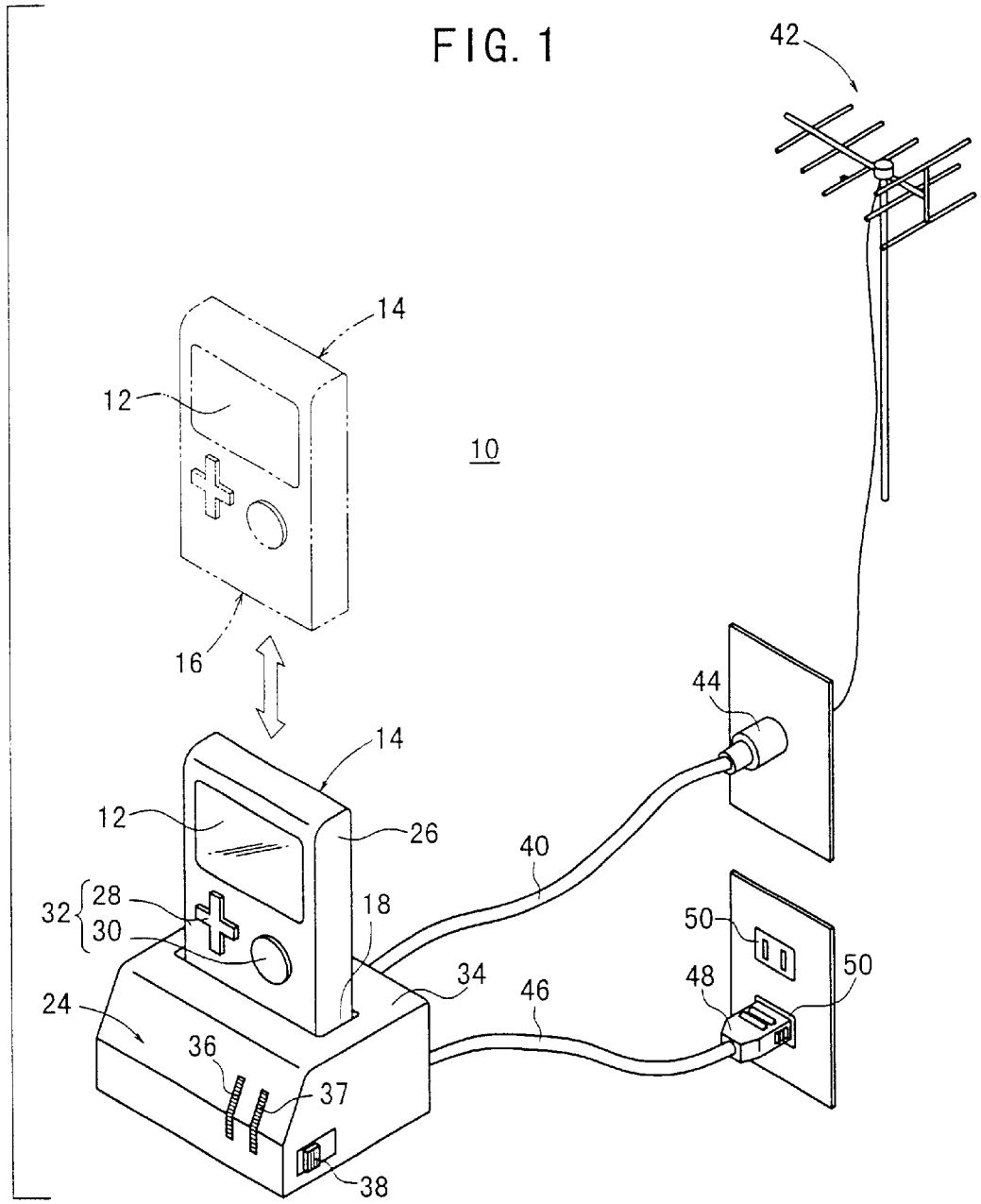
FIG. 1 is a perspective view of a data reception system according to an embodiment of the present invention.

FIG. 1 shows in perspective a data reception system 10 according to an embodiment of the present invention. As shown in FIG. 1, the data reception system 10 basically comprises a portable information terminal 14 having a liquid crystal display (LCD) unit 12 having a color liquid crystal display screen of 32 pixels×240 pixels, for example, and a battery charging device 24 having a cavity 18 defined vertically therein for inserting a lower end 16 of the portable information terminal 14 therein, for charging a secondary battery disposed in the portable information terminal 14. The battery charging device 24 has a data reception function as described later on.

The battery charging device 24 has a casing 26 supporting the LCD unit 12 and a control key assembly 32 including a cross key 28 and a circular decision key 30. The decision key 30 also functions as a power supply switch for the portable information terminal 14.

The battery charging device 24 has a casing 34 which has the cavity 18 therein and also supports a charging indicator lamp 36 for indicating a battery charging state, e.g., battery charging in progress, battery charging ended, etc., a reception indicator lamp 37 for indicating that the portable information terminal 14 is receiving data, and a channel selection switch 38 for selecting a desired channel for data broadcasting.

The battery charging device 24 is connected by a coaxial cable 40 to a coaxial terminal 44 which is connected to an aerial antenna 42 for receiving data broadcasts, and is also connected by a power supply cord 46 and an AC plug 48 to an AC outlet 50 which is supplied with a commercial AC electric power from an external AC power supply.

Figure 2:
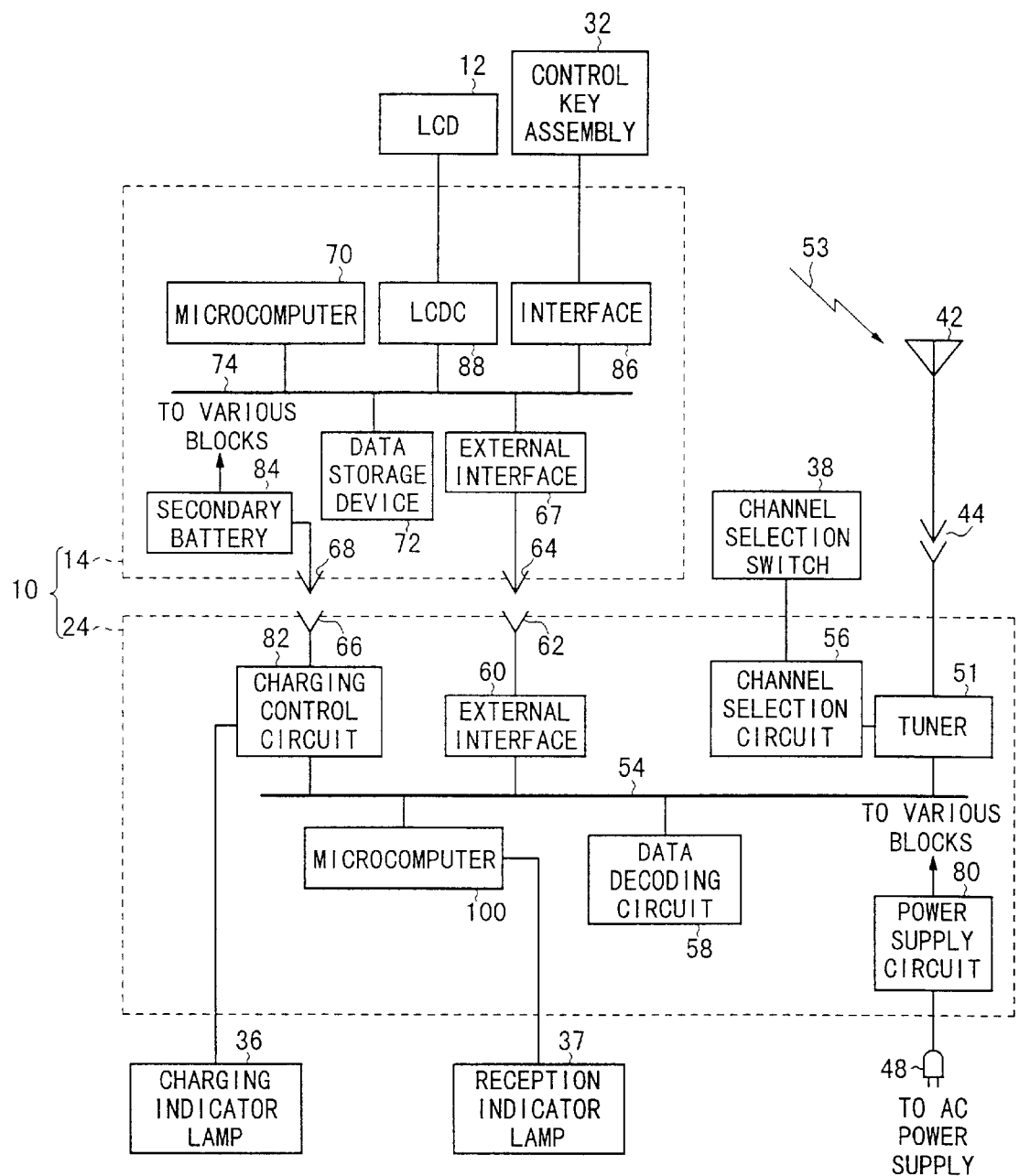
FIG. 2 is a block diagram of a circuit arrangement of the data reception system shown in FIG. 1.

FIG. 2 shows in block form a circuit arrangement of the data reception system 10 shown in FIG. 1. In FIG. 2, the portable information terminal 14 is shown as being inserted in the cavity 18 in the battery charging device 24 for a charging mode, i.e., the battery charging device 24 and the portable information terminal 14 are electrically connected to each other by pairs of connection terminals 62, 64 and connection terminals 66, 68.

While each of the connection terminals 62, 64, 66, 68 is illustrated as being connected to a single wire for the sake of brevity, it is actually connected to a plurality of wires. The connection terminals 64, 68 are disposed on a lower surface of the lower end 16 of the portable information terminal 14, and the connection terminals 62, 66 are disposed on a bottom surface of the cavity 18 in the battery charging device 24. When the portable information terminal 14 is mounted in the battery charging device 24, the connection terminals 64, 68 are electrically connected to the respective connection terminals 62, 66 under the weight of the portable information terminal 14.

In FIG. 2, the battery charging device 24 of the data reception system 10 has a tuner 51 as a data reception circuit for receiving data supplied from an external source. The tuner 51 extracts data from a television wave 53 received by the antenna 42.

The television wave 53 is a data broadcasting wave which can distribute various digital contents, i.e., various forms of information including pictures, images (moving and still images), sounds, characters, numerals, etc. representing programs that can be played back on television receivers and radio receivers, commercials, newspaper articles, and magazine articles, using vertical blanking interleaving intervals (VBI) of NTSC broadcasting waves as ground television broadcasting waves. Therefore, the television wave 53 can be received by the antenna 42 which may be a conventional Yagi antenna, for example.

The television wave 53 contains a plurality of channel waves. In order to select and receive a desired channel, the channel selection switch 38 (see also FIG. 1) sets up channel information which causes a channel selection circuit 56 to switch to a desired selected frequency at the tuner 51.

An NTSC signal selected and received by the tuner 51 is supplied via a bus 54 to a data decoding circuit 58. If the NTSC signal includes multiplexed contents data as described above, then the contents data is decoded by the data decoding circuit 58 and sent to the portable information terminal 14 via an external interface 60 as a serial interface and the connection terminal 62 under the control of a microcomputer 100 which functions as a reception controller.

The data decoding circuit 58 may be integrally combined with the microcomputer 100.

The data sent from the battery charging device 24 via the connection terminal 62 to the portable information terminal 14 is stored into a data storage device 72, which comprises an electrically erasable programmable ROM (Read-Only Memory) such as a flash memory, via the connection terminal 64, an external interface 67 as a serial interface, and a bus 74 under the control of a microcomputer 70.

The data storage device 72 may have a storage capacity of 16 MB if data of a data broadcast having a data rate of about 40 kbps is to be stored for at least 50 minutes (40 kbps÷8 bits×50 min.×60 sec.=15 MB).

Each of the microcomputers 100, 70 comprises a CPU (Central Processing Unit), a ROM (including an EEPROM), a RAM (Random-Access Memory), an input/output interface, clock, a timer, etc., and functions as a controller, an arithmetic unit, a processor, etc. Therefore, the function of the data decoding circuit 58 may be performed by the microcomputer 100.

The reception indicator lamp 37 is connected to the microcomputer 100 of the battery charging device 24. The reception indicator lamp 37 is controlled by the microcomputer 100 such that it is turned on while data is being transferred from the battery charging device 24 to the data storage device 72 and data is being stored into the data storage device 72, and turned off otherwise.

The battery charging device 24 also has a power supply circuit 80 for converting the AC electric power at AC 100 V supplied from the external AC power supply via the AC outlet 50 into DC electric power, and supplying the DC electric power to all blocks in the battery charging device 24.

The battery charging device 24 also has a charging control circuit 82 for converting the DC electric power supplied from the power supply circuit 80 into DC electric power suitable for battery charging, and supplying the DC electric power via the connection terminals 66, 68 to a secondary battery 84 of the portable information terminal 14 thereby to charge the secondary battery 84. The charging control circuit 82 carries out a charging control process for detecting the temperature of the secondary battery 84 to control a charging current supplied thereto, detecting a remaining capacity of the secondary battery 84, and detecting a fully charged state of the secondary battery 84.

The secondary battery 84 may comprise a lithium ion battery, a nickel hydrogen battery, or the like.

The charging indicator lamp 36 is connected to the charging control circuit 82. The charging indicator lamp 36 is controlled by the charging control circuit 82 such that it is turned on while the secondary battery 84 is being charged and turned off when the secondary battery 84 is fully charged.

The control key assembly 32 (see also FIG. 1) is connected to the bus 74 via an interface 86, and the LCD unit 12 is connected to the bus 74 via a LCD controller (LCDC) 88.

A process of receiving a data broadcast with the battery charging device 24 and storing the data into the data storage device 72 of the portable information terminal 14 while the secondary battery 84 of the portable information terminal 14 is being charged by the battery charging device 24 will be described in detail below with reference to FIG. 3.

Figure 3:
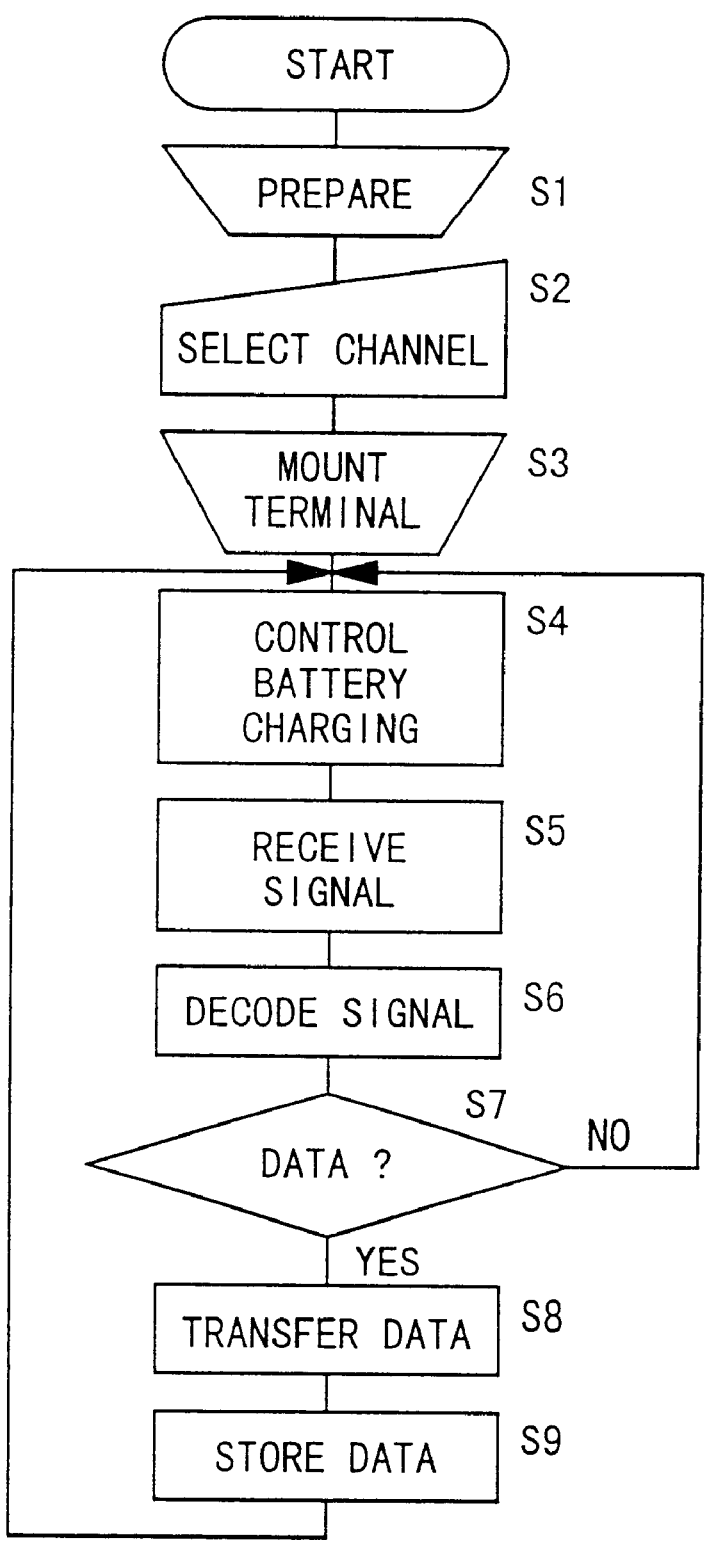
FIG. 3 is a flowchart of an operation sequence of the data reception system shown in FIGS. 1 and 2 when a secondary battery is charged.

In step S1 shown in FIG. 3, which is a preparatory step, the AC plug 48 of the battery charging device 24 is connected to the AC outlet 50 by the user, and the coaxial cable 40 is connected to the coaxial terminal 44 by the user.

In step S2, the channel selection switch 38 of the battery charging device 24 is manually operated by the user to selected a desired one of a plurality of available channels. A desired channel may alternatively be selected on the basis of channel information which has been entered by the control key assembly 32 and stored into the memory (EEPROM) in the microcomputer 70. If such an alternative is employed, then the channel selection switch 38 may be dispensed with. The function of the channel selection circuit 56 may be stored as a program in the memory in the microcomputer 70.

In step S3, the portable information terminal 14 is manually inserted into the cavity 18 in the battery charging device 24, and hence mounted in the battery charging device 24 by the user. The connection terminals 62, 66 of the battery charging device 24 and the connection terminals 64, 68 of the portable information terminal 14 are connected under the weight of the portable information terminal 14. The portable information terminal 14 can easily be mounted in and detached from the battery charging device 24. Usually, the portable information terminal 14 is mounted in the battery charging device 24 when the user of the portable information terminal 14 gets home or goes to bed at night.

In step S4, the connection terminals 62, 66 of and the connection terminals 64, 68 are connected to each other, and the microcomputer 100 wakes up, supplying DC electric power from the power supply circuit 80 via the charging control circuit 82 to the secondary battery 84. At this time, the charging control circuit 82 carries out its charging control process to monitor the charging current, the charged quantity (remaining capacity), the charging temperature, and the fully charged state, etc.

In step S5, the tuner 51 receives the television wave 53 carrying a data broadcast via the antenna 42 and the coaxial cable 40.

If the television wave 53 is transmitted during a fixed time, then the clock and timer of the microcomputer 100 may be used to supply electric power to the tuner 51, the data decoding circuit 58, etc. only during that fixed time.

In this embodiment, it is assumed that the television wave 53 broadcast from a broadcasting station (not shown) contains data representing newspaper clippings about local news, economy news, and sports news (hereinafter referred to as "newspaper article data") from 4:00 a.m. to 4:30 a.m. as a VBI signal relative to the data broadcast. The data of the VBI signal may be compressed. If the data of the VBI signal is compressed, then the data decoding circuit 58 stores a data expansion program, or the VBI signal contains an interleaved data expansion program, which will be loaded into the data decoding circuit 58 when the VBI signal is decoded by the data decoding circuit 58.

In step S5, the television wave 53 received by the antenna 42 is demodulated by the tuner 51 into an NTSC signal in the channel which has been selected by the channel selection switch 38 and the channel selection circuit 56.

In step S6, the data decoding circuit 58 decodes the NTSC signal in an attempt to separate data, i.e., today's newspaper article data, which has been multiplexed in the NTSC signal.

If data which has been multiplexed in the NTSC signal, i.e., today's newspaper article data, is detected by the decoding process carried out by the data decoding circuit 58 (YES in step S7), then the presence of the data is indicated from the data decoding circuit 58 to the microcomputer 100.

The microcomputer 100 recognizes the presence of the data, and turns on the reception indicator lamp 37.

In step S8, the data decoding circuit 58 transfers the today's newspaper article data as digital contents via the external interface 60, the connection terminals 62, 64, the external interface 67, and the bus 74 to the data storage device 72 of the portable information terminal 14. In step S9, the transferred newspaper article data is stored in the data storage device 72.

Thereafter, the processing in step S4 and following steps is repeated. If no multiplexed data is present in the NTSC signal in step S7, then the processing in step S4 and following steps is also repeated.

The operation sequence shown in FIG. 3 is continued until the portable information terminal 14 is detached from the battery charging device 24. If an amount of data which exceeds the available storage capacity of the data storage device 72 is transferred from the data decoding circuit 58 to the data storage device 72, then a so-called FIFO process is carried out to update (overwrite) the stored data by erasing the data previously stored in the data storage device 72 and storing the newly transferred data in the data storage device 72.

The data storage device 72 may be arranged such that the data stored in the data storage device 72 will automatically be erased a certain period of time, e.g., 30 minutes, after the portable information terminal 14 is mounted in the battery charging device 24.

Figure 4:
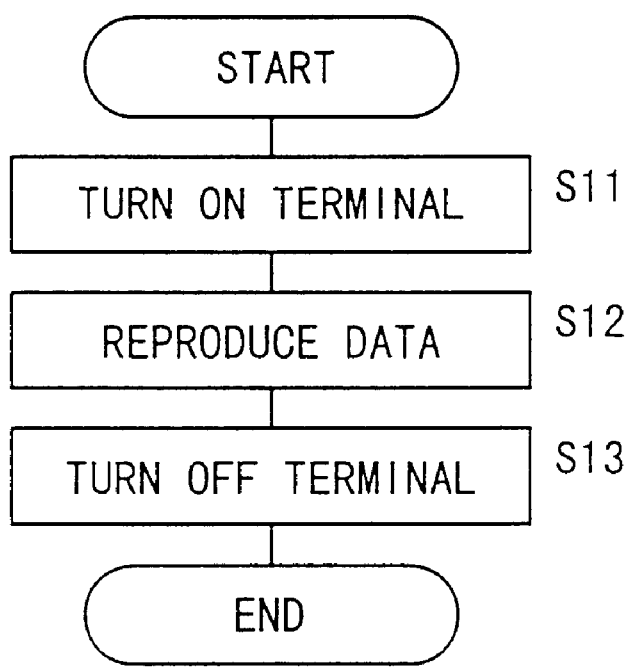
FIG. 4 is a flowchart of an operation sequence of the data reception system shown in FIGS. 1 and 2 when a portable information terminal singly operates.

After the portable information terminal 14 is removed from the battery charging device 24 by the user at about 7 a.m., for example, the user presses the decision switch 30 continuously for a given period of time in step S11 shown in FIG. 4, turning on the portable information terminal 14. In step S12, the microcomputer 70 reads the data from the data storage device 72, and controls the LCDC 88 to reproduce the data on the LCD unit 12. Therefore, the newspaper article data received by the tuner 51 of the battery charging device 24 is reproduced on the display screen of the LCD unit 12. A speaker interface and an audio signal output terminal may be connected to the bus 74 in the portable information terminal 14, and sounds may be reproduced by a speaker or earphone connected to the audio signal output terminal in synchronism with the reproduction of image data on the LCD unit 12. Only sounds may be reproduced by such a speaker or earphone.

While the newspaper article data is being reproduced in step S12, the user may use the cross key 28 to rewind, fast-feed, pause, or otherwise process the newspaper article data being reproduced.

When the decision key 30 is continuously pressed against for a given period of time while the newspaper article data is being reproduced in step S12, the portable information terminal 14 is turned off in step S13.

Contents data that can be received as data broadcasts are not limited to newspaper article data, but may include other data such as game data, fortune-telling data, etc. If such other data are included as contents data, then the user can retrieve such data in an interactive application on the portable information terminal 14 using the control key assembly 32.

Usually, the portable information terminal 14 is carried around by the user when the user goes out, and mounted in the battery charging device 24 when the user gets home at evening. If the broadcasting station has such an infrastructure that a data broadcast is on air from 4:00 a.m. to 4:30 a.m. next morning, then by the time the user goes out in the morning, the secondary battery 84 has been fully charged, and the latest data, e.g., today's newspaper article data, has been stored in the data storage device 72.

Therefore, the user is able to reproduce the latest data stored in the data storage device 72 of the portable information terminal 14 while the user is commuting on a commuter train, for example. As a result, the user whose has the data reception system 10 can automatically receive and reproduce the latest data everyday.

The portable information terminal 14 arranged as shown in FIGS. 1 and 2 does not require a data reception circuit including the tuner 51 which has a large power requirement and a relatively large volume, and hence is relatively small in size and weight.

The user of the portable information terminal 14 is able to read newspaper articles as electronic data on the LCD unit 12. Therefore, the user find printed newspapers unnecessary, and hence the portable information terminal 14 is a paper resource saver. The portable information terminal 14 thus arranged can be used a novel video medium, not conventionally available, different from the conventional portable television receivers.

Figure 5:
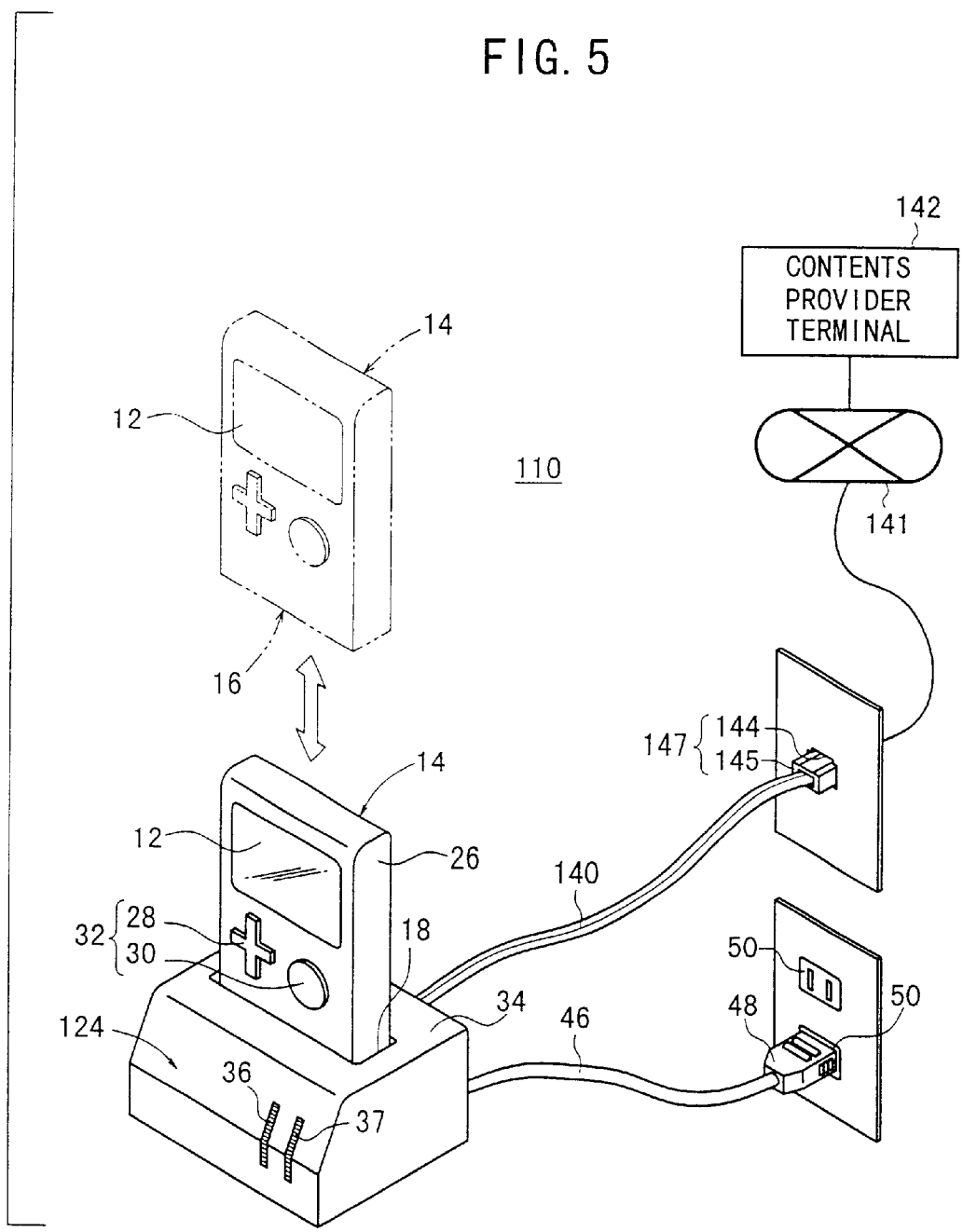
FIG. 5 is a perspective view of a data transmission and reception system according to another embodiment of the present invention.
Figure 6:
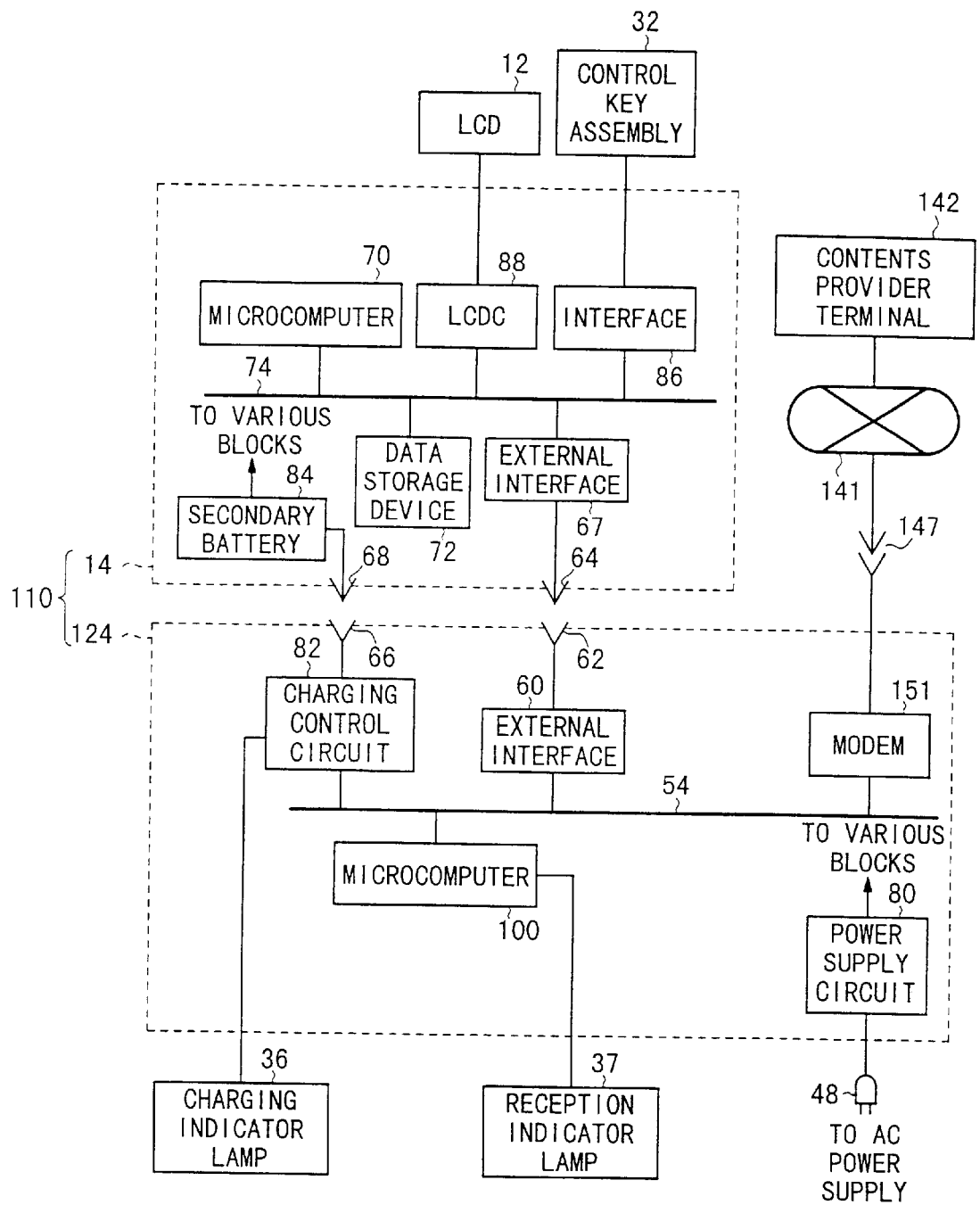
FIG. 6 is a block diagram of a circuit arrangement of the data transmission and reception system shown in FIG. 5.

FIGS. 5 and 6 show a data transmission and reception system 110 according to another embodiment of the present invention. The data transmission and reception system 110 comprises the portable information terminal 14 and a battery charging device 124 having a data transmission and reception function. Those parts of the data transmission and reception system 110 which are identical to those of the data reception system 10 shown in FIGS. 1 and 2 are denoted by identical reference numerals, and will not be described in detail below.

As shown in FIGS. 5 and 6, a modem 151 as a data transmission and reception circuit is connected to the bus 54 of the battery charging device 124. The modem 151 has an external input/output terminal connected to a circuit 141 such as a public circuit by a cable 140 and a modular connector 147 which comprises a modular plug 145 and a modular jack 144. A terminal 142 of a contents provider, i.e., a contents provider terminal 142, is connected to the circuit 141.

A process of receiving data broadcast from the contents provider terminal 142 with the battery charging device 124 and storing the data into the data storage device 72 of the portable information terminal 14 while the secondary battery 84 of the portable information terminal 14 is being charged by the battery charging device 124 will be described in detail below with reference to FIG. 7.

Figure 7:
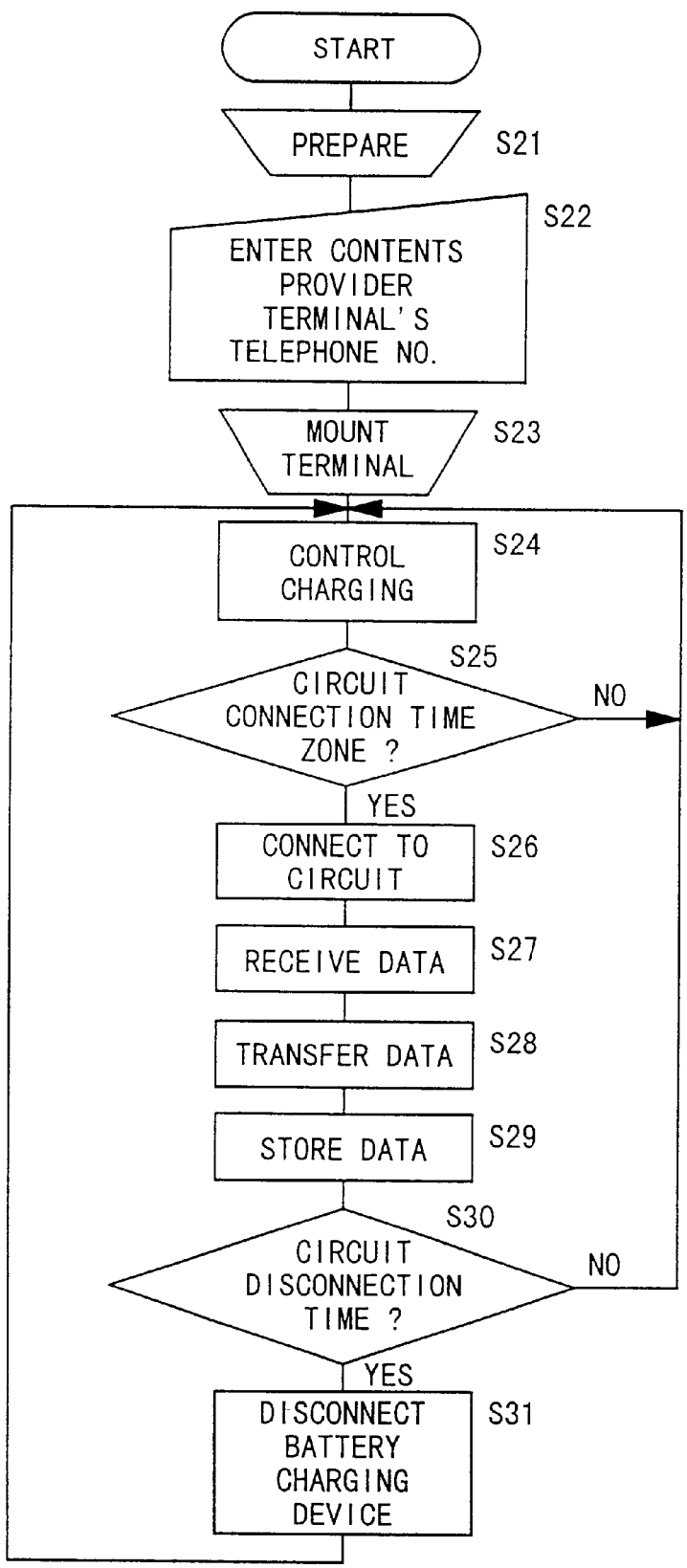
FIG. 7 is a flowchart of an operation sequence of the data transmission and reception system shown in FIGS. 5 and 6 when a secondary battery is charged.

In step S21 shown in FIG. 7, which is a preparatory step, the AC plug 48 of the battery charging device 124 is connected to the AC outlet 50 by the user, and the modular plug 145 is connected to the modular jack 144 by the user.

In step S22, while the portable information terminal 14 is used as a stand-alone unit, the user operates the control key assembly 32 of the portable information terminal 14 to enter the telephone number of the contents provider terminal 142 into the data storage device 72.

In step S23, the portable information terminal 14 is manually inserted into the cavity 18 in the battery charging device 24, and hence mounted in the battery charging device 24 by the user. Usually, the portable information terminal 14 is mounted in the battery charging device 24 when the user of the portable information terminal 14 gets home or goes to bed at night.

In step S24, the connection terminals 62, 66 of and the connection terminals 64, 68 are connected to each other, and the microcomputer 100 as a transmission and reception controller wakes up, supplying DC electric power from the power supply circuit 80 via the charging control circuit 82 to the secondary battery 84. At this time, the charging control circuit 82 carries out its charging control process to monitor the charging current, the charged quantity (remaining capacity), the charging temperature, and the fully charged state, etc.

In step S25, the microcomputer 100 and/or the microcomputer 70 refers to its own clock to determine whether the present time is in a circuit connection time zone (4:30 a.m. to 5:00 a.m., for example) for connection to the contents provider terminal 142. If the present time is not in the circuit connection time zone, then the charging control processing in step S24 is continued. If the present time is in the circuit connection time zone, then the battery charging device 124 connects itself to the circuit 141 in step S26.

Specifically, in step S26, the microcomputer 100 reads the telephone number of the contents provider terminal 142 from the data storage device 72, stores the read telephone number into the memory (EEPROM) in the microcomputer 100, sends an off-hook signal via the modem 151, and accesses the contents provider terminal 142 via the modem 151 and the circuit 141.

When the circuit 141 is connected between the modem 151 and the contents provider terminal 142, the contents provider terminal 142 transmits today's newspaper article data, and the modem 151 receives the transmitted newspaper article data in step S27.

The data received by the modem 151 is transferred via the bus 54, the external interface 60, the connection terminals 62, 64, the external interface 67, and the bus 74 to the data storage device 72 in step S28. The transferred data is stored in the data storage device 72 in step S29.

In step S30, the microcomputer 100 and/or the microcomputer 70 refers to its own clock to determine whether the present time is a circuit disconnection time (5:00 a.m.) for disconnection from the contents provider terminal 142. If the present time is not the circuit disconnection time, then the processing in step S24–step S30 is repeated.

If the present time is the circuit disconnection time, then the battery charging device 124 sends an on-hook signal via the modem 151 to disconnect itself from the circuit 141 in step S31.

After the portable information terminal 14 is removed from the battery charging device 24 by the user at about 7 a.m., for example, the data stored in the data storage device 72 is reproduced by the user in the same manner as described above with reference to FIG. 4.

The data transmission and reception system 110 shown in FIGS. 5 and 6 allows the user to automatically receive the latest contents data such as newspaper article data everyday from the contents provider terminal 142 without receiving television broadcasts. The data transmission and reception system 110 shown in FIGS. 5 and 6 also offers the same advantages as those of the data reception system 10 shown in FIGS. 1 and 2.

Figure 8:
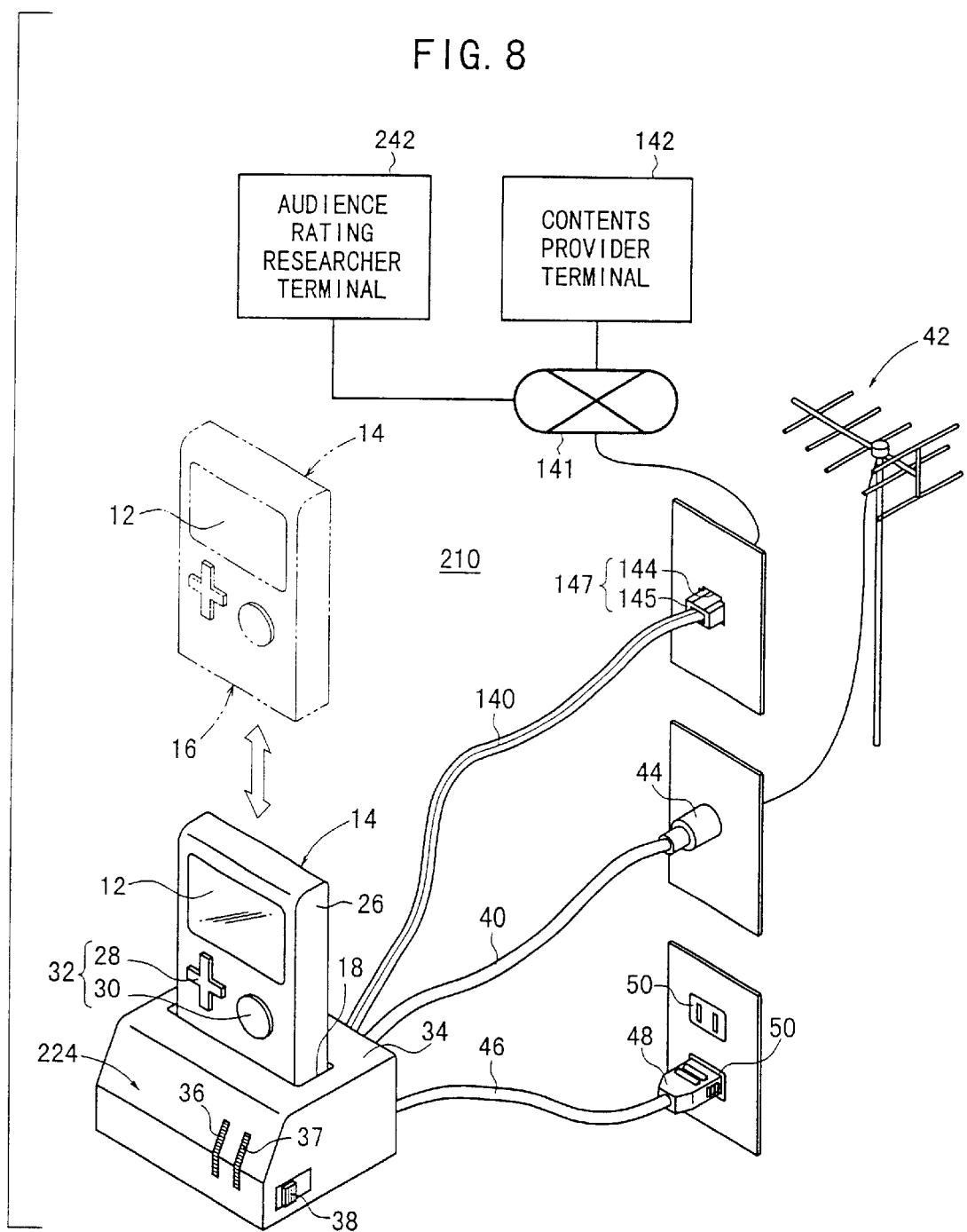
FIG. 8 is a perspective view of a data transmission and reception system according to still another embodiment of the present invention.
Figure 9:
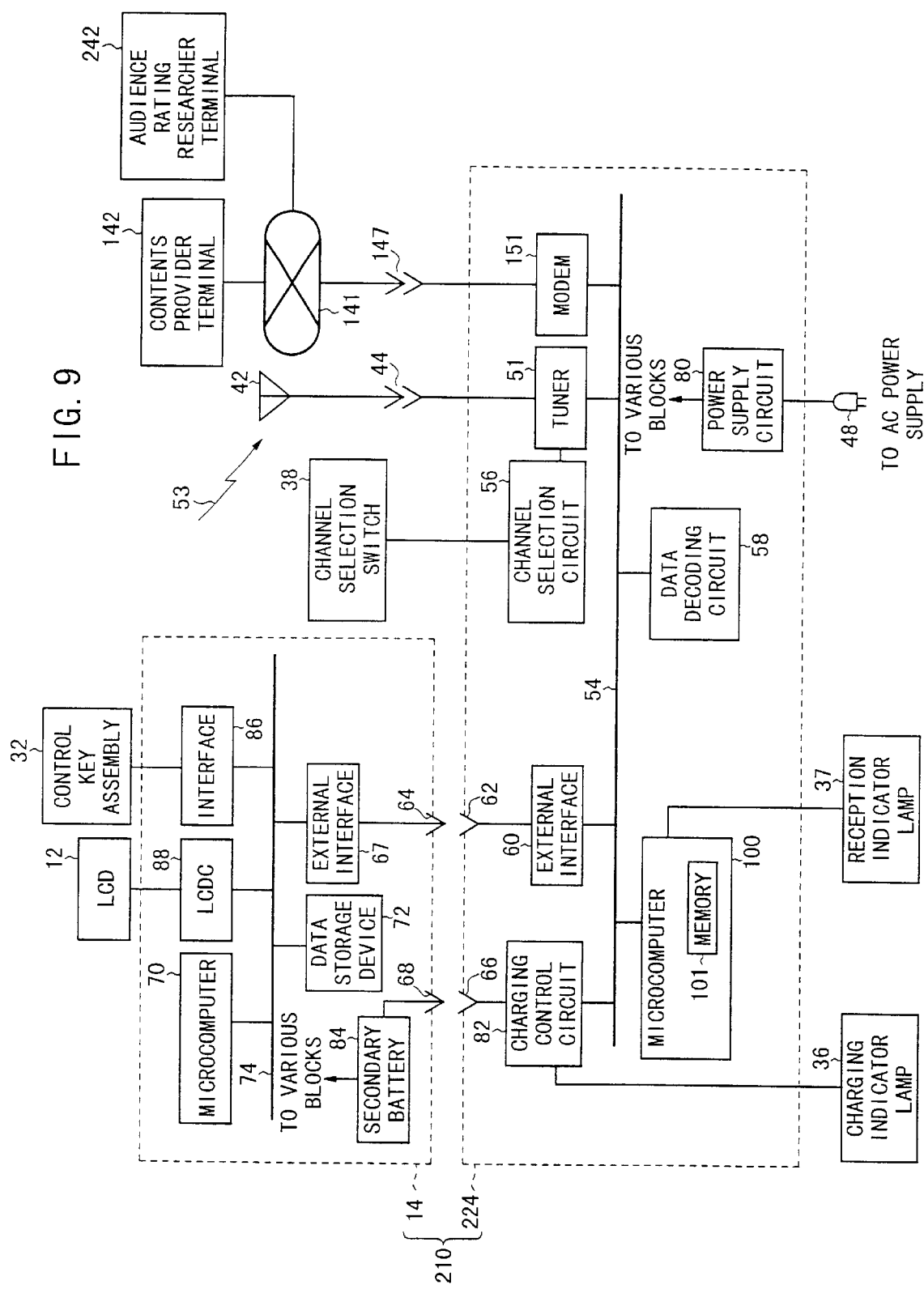
FIG. 9 is a block diagram of a circuit arrangement of the data transmission and reception system shown in FIG. 8.

FIGS. 8 and 9 show a data transmission and reception system 210 according to still another embodiment of the present invention. The data transmission and reception system 210 comprises the portable information terminal 14 and a battery charging device 224 having a data transmission and reception function. Those parts of the data transmission and reception system 210 which are identical to those of the data reception system 10 shown in FIGS. 1 and 2 or those of the data transmission and reception system 110 shown in FIGS. 5 and 6 are denoted by identical reference numerals, and will not be described in detail below.

The data transmission and reception system 210 shown in FIGS. 8 and 9 comprises a combination of the data reception system 10 shown in FIGS. 1 and 2 and the data transmission and reception system 110 shown in FIGS. 5 and 6. The battery charging device 224 has both the tuner 51 and the modem 151.

A terminal 242 of an audience rating researcher, i.e., an audience rating researcher terminal 242, is connected to the circuit 141. The data storage device 72 of the portable information terminal 14 of the data transmission and reception system 210 shown in FIGS. 8 and 9 has a storage capacity of 32 MB which is twice the storage capacity of the data storage devices 72 of the data transmission and reception systems 10, 110 shown in FIGS. 1 and 2 and FIGS. 5 and 6.

A data transmission and reception process of the data transmission and reception system 210 shown in FIGS. 8 and 9 while the secondary battery 84 of the portable information terminal 14 is being charged by the battery charging device 224 will be described in detail below with reference to FIG. 10.

Figure 10:
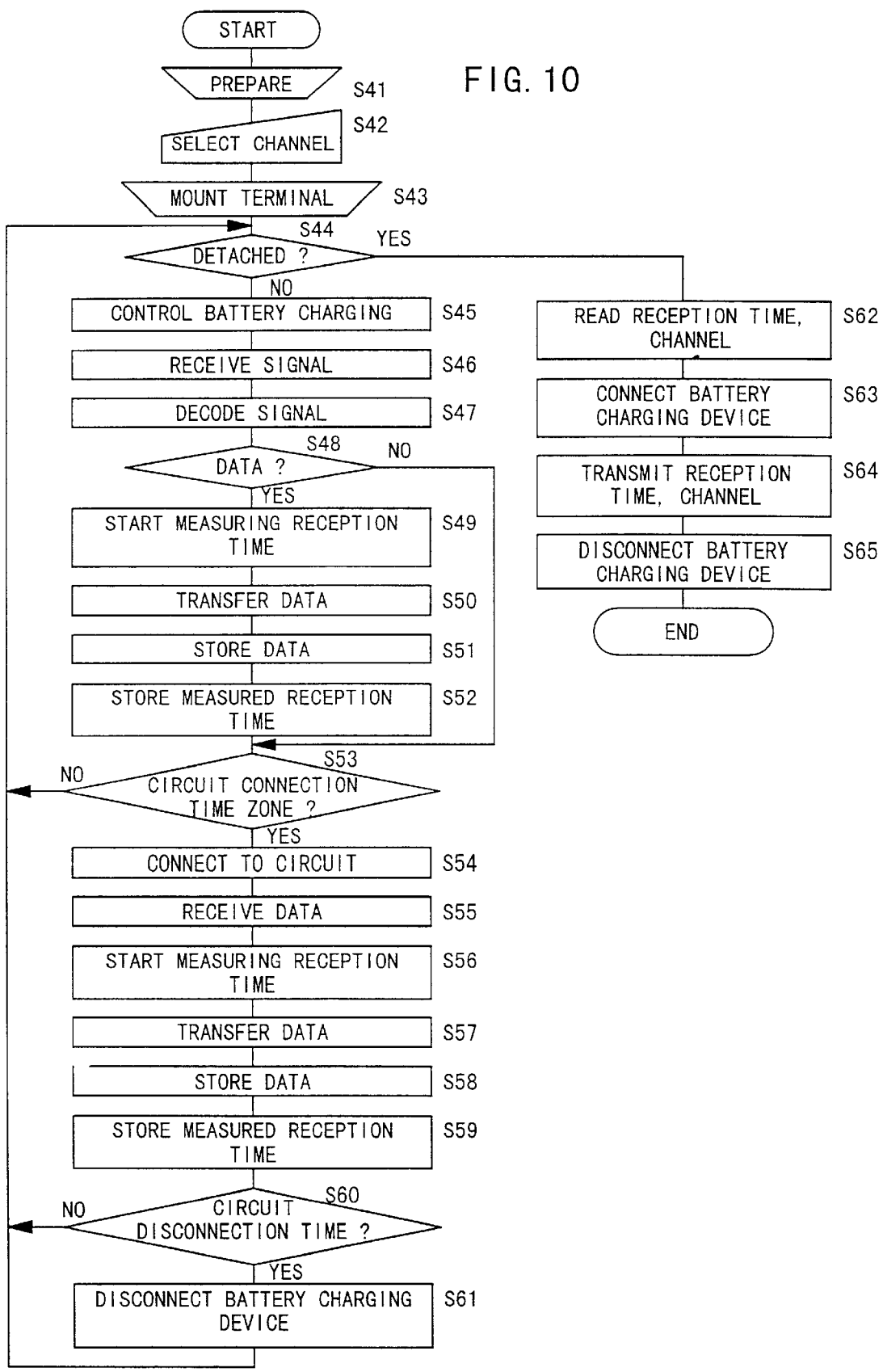
FIG. 10 is a flowchart of an operation sequence of the data transmission and reception system shown in FIGS. 8 and 9 when a secondary battery is charged.

In step S41 shown in FIG. 10, which is a preparatory step, the AC plug 48 of the battery charging device 224 is connected to the AC outlet 50 by the user, the coaxial cable 40 is connected to the coaxial terminal 44 by the user, and the modular plug 145 is connected to the modular jack 144 by the user.

In step S42, the channel selection switch 48 of the battery charging device 24 is manually operated by the user to selected a desired one of a plurality of available channels. While the portable information terminal 14 is used as a stand-alone unit, the user operates the control key assembly 32 of the portable information terminal 14 to enter the telephone number of the contents provider terminal 142, e.g., the terminal of a desired contents provider which provides as contents entertainment information and amusement information that change everyday, and the telephone number of the audience rating researcher terminal 242 into the data storage device 72. Since the entry of the telephone numbers is up to the manual operation of the user, the user may not enter the telephone number of the audience rating researcher terminal 242 if the user thinks the entry of that telephone number unnecessary.

In step S43, the portable information terminal 14 is manually inserted into the cavity 18 in the battery charging device 224, and hence mounted in the battery charging device 224 by the user. Usually, the portable information terminal 14 is mounted in the battery charging device 224 when the user of the portable information terminal 14 gets home or goes to bed at night.

The connection terminals 62, 66 of and the connection terminals 64, 68 are connected to each other, and the microcomputer 100 wakes up. The microcomputer 100 monitors whether the portable information terminal 14 is detached from the battery charging device 224 or not in step S44.

If the portable information terminal 14 is not detached from the battery charging device 224, i.e., if the portable information terminal 14 is mounted in the battery charging device 224, then DC electric power is supplied from the power supply circuit 80 via the charging control circuit 82 to the secondary battery 84 in step S45. At this time, the charging control circuit 82 carries out its charging control process to monitor the charging current, the charged quantity (remaining capacity), the charging temperature, and the fully charged state, etc.

In step S46, the tuner 51 receives the television wave 53 carrying a data broadcast via the antenna 42 and the coaxial cable 40.

If the television wave 53 is transmitted during a fixed time, then the clock and timer of the microcomputer 100 may be used to supply electric power to the tuner 51, the data decoding circuit 58, etc. only during that fixed time.

In this embodiment, it is assumed that the television wave 53 broadcast from a broadcasting station (not shown) contains data representing newspaper clippings about local news, economy news, and sports news (hereinafter referred to as "newspaper article data") from 4:00 a.m. to 4:30 a.m. as a VBI signal relative to the data broadcast.

In step S46, the television wave 53 received by the antenna 42 is demodulated by the tuner 51 into an NTSC signal in the channel which has been selected by the channel selection switch 38 and the channel selection circuit 56.

In step S47, the data decoding circuit 58 decodes the NTSC signal in an attempt to separate data, i.e., today's newspaper article data, which has been multiplexed in the NTSC signal.

If data which has been multiplexed in the NTSC signal, i.e., today's newspaper article data, is detected by the decoding process carried out by the data decoding circuit 58 (YES in step S48), then the presence of the data is indicated from the data decoding circuit 58 to the microcomputer 100 which functions as a transmission and reception controller.

The microcomputer 100 recognizes the presence of the data, and turns on the reception indicator lamp 37.

In step S49, the microcomputer 100 starts measuring the time during which the data broadcast is received.

In step S50, the data decoding circuit 58 transfers the today's newspaper article data as digital contents via the external interface 60, the connection terminals 62, 64, the external interface 67, and the bus 74 to the data storage device 72 of the portable information terminal 14. In step S51, the transferred newspaper article data is stored in a first memory area in the data storage device 72 which serves as a second memory.

Thereafter, in step S52, the time during which the data broadcast is received, which has started being measured in step S49, is stored. The measured times for the reception channel are accumulated and stored in a memory 101 in the microcomputer 100 which serves as a first memory.

Figure 11:
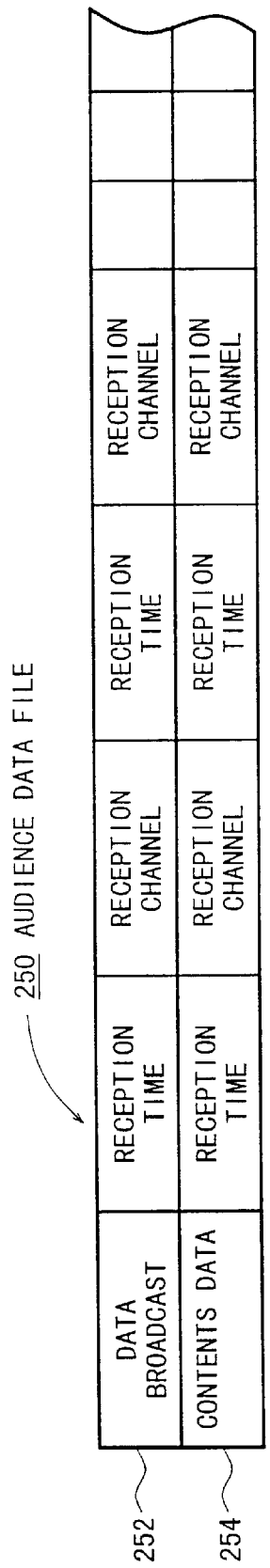
FIG. 11 is a diagram illustrative of an audience data file.

FIG. 11 shows details of an audience data file 250 stored in the memory 101. The audience data file 250 contains in its upper row successive data broadcast sets 252 each comprising the time during which a data broadcast is received (from hh:mm:ss to hh:mm:ss), and the reception channel (the channel selected by the channel selection circuit 56). Such a data broadcast set is stored each time the processing in step S52 is executed.

In step S53, the microcomputer 100 and/or the microcomputer 70 refers to its own clock to determine whether the present time is in a circuit connection time zone (4:30 a.m. to 5:00 a.m., for example) for connection to the contents provider terminal 142. If the present time is not in the circuit connection time zone, then the charging control processing and the data broadcast reception processing in step S45–step S52 are repeated.

If the present time is in the circuit connection time zone in step S53, then the battery charging device 124 connects itself to the circuit 141 in step S54. Specifically, the microcomputer 100 reads the telephone number of the contents provider terminal 142 from the data storage device 72, stores the read telephone number into the memory 101, sends an off-hook signal via the modem 151, and accesses the contents provider terminal 142 via the modem 151 and the circuit 141. At this time, the microcomputer 100 reads the telephone number of the audience rating researcher terminal 242 as well as the telephone number of the contents provider terminal 142 from the data storage device 72, and stores it into the memory 101.

When the circuit 141 is connected between the modem 151 and the contents provider terminal 142, the contents provider terminal 142 transmits contents data relative to today's entertainment information and amusement information, and the modem 151 receives the transmitted data in step S55.

When the contents data is received by the modem 151, the time during which the contents data is received starts being measured in step S56.

The data received by the modem 151 is transferred via the bus 54, the external interface 60, the connection terminals 62, 64, the external interface 67, and the bus 74 to a second memory area, different from the first memory area for storing newspaper article data, in the data storage device 72 in step S57. The transferred data is stored in the second memory area in the data storage device 72 in step S58.

In step S59, the time during which the contents data is received, which has started being measured in step S56, is stored. The measured times for the reception channel, i.e., the telephone number of the contents provider terminal 142, are accumulated and stored in the memory 101 in the microcomputer 100. The audience data file 250 shown in FIG. 11 contains in its lower row successive contents data sets 254 each comprising the time during which contents data is received (from hh:mm:ss to hh:mm:ss), and the reception channel (the telephone number of the contents provider terminal 142). Such contents data set is stored each time the processing in step S59 is executed.

In step S60, the microcomputer 100 and/or the microcomputer 70 refers to its own clock to determine whether the present time is a circuit disconnection time (5:00 a.m.) for disconnection from the contents provider terminal 142. If the present time is not the circuit disconnection time, then the processing in step S44 and following steps is repeated.

If the present time is the circuit disconnection time, then the battery charging device 124 sends an on-hook signal via the modem 151 to disconnect itself from the circuit 141. Thereafter, the processing in step S44 and following steps is repeated.

During the time period from 4:00 a.m. to 5:00 a.m., usually, the processing from step S45, if negative in step S44, to step S60 is repeated. After the battery charging device 124 is disconnected from the circuit 141 in step S61, if the portable information terminal 14 is removed from the battery charging device 24 by the user at about 7 a.m., for example, then the portable information terminal 14 is judged as being detached from the battery charging device 224 in step S44.

After the portable information terminal 14 is removed from the battery charging device 224, the microcomputer 100 reads the telephone number of the audience rating researcher terminal 242, stored in step S54, from the memory 101 in step S62, and connects the battery charging device 224 via the modem 151 and the circuit 141 to the audience rating researcher terminal 242 in step S63.

In step S64, the microcomputer 100 reads the audience data file 250 from the memory 101, and transmits a data broadcast reception status, a contents data reception status, and a contents audience rating to the audience rating researcher terminal 242. Thereafter, the battery charging device 124 is disconnected from the circuit 141 to the audience rating researcher terminal 242 in step S65.

Then, as shown in FIG. 12, the user turns on the portable information terminal 14 in step S71.

In step S72, the LCD unit 12 of the portable information terminal 14 displays an image for prompting the user to select the reproduction of the data broadcast or the reproduction of the contents data.

If the user selects a desired one of the data, e.g., the data broadcast, with the cross key 28 in step S73, then the selected data is read from the data storage device 72 and displayed on the LCD unit 12 in step S74.

In step S75, the user turns off the portable information terminal 14 to finish the reproduction of the data. While the selected data is being reproduced, the user may change it to another stored data broadcast.

As described above, the data transmission and reception system 210 is capable of viewing data broadcasts via the television wave 53 and also obtaining desired contents data from the contents provider terminal 142 via the circuit 141. Since the audience data file 250 is transmitted to the audience rating researcher terminal 242, the audience rating researcher terminal 242 can calculate an audience rating. While the audience data file 250 can automatically be transmitted to the audience rating researcher terminal 242, it is up to the user to decide whether to send the audience data file 250 to the audience rating researcher terminal 242 or not.

The data transmission and reception system 210 shown in FIGS. 8 and 9 also offers the same advantages as those of the data transmission and reception system 110 shown in FIGS. 5 and 6 and the data reception system 10 shown in FIGS. 1 and 2.

In the above embodiments, data of a data broadcast is interleaved (multiplexed) in the vertical blanking interleaving intervals (VBI) of an NTSC broadcasting signal. However, a data broadcast may be carried by a PAL signal, a digital television signal, etc.

According to the present invention, as described above, since the battery charging device for charging the secondary battery of the portable information terminal has a data reception function and/or a data transmission function, data can be transmitted from and received by the battery charging device while the battery charging device is charging the secondary battery of the portable information terminal.

The data that is received while the battery charging device is charging the secondary battery is stored in the memory of the portable information terminal, for example, while the battery charging device is charging the secondary battery. After the portable information terminal is removed from the battery charging device, the data stored in the memory can be reproduced.

Usually, the portable information terminal is connected to the battery charging device at night for charging the secondary battery of the portable information terminal. Each time the portable information terminal is connected to the battery charging device, the data stored in the memory can automatically be updated (overwritten).

Although certain preferred embodiments of the present invention have been shown and described in detail, it should be understood that various changes and modifications may be made therein without departing from the scope of the appended claims.

What is claimed is:

1. A reception system comprising:
   a portable information terminal having a secondary battery, an external interface, and a memory; and
   a battery charging device for charging said secondary battery, said battery charging device having a data reception circuit for receiving data supplied by data broadcasting or data supplied via a network;
   the arrangement being such that when said portable information terminal and said battery charging device are connected to each other, said secondary battery is charged by said battery charging device, and data received by said data reception circuit is stored into said memory of the portable information terminal via said external interface.

2. A reception system according to claim 1, wherein said portable information terminal has a display unit for displaying the data stored in said memory.

3. A reception system according to claim 1, wherein the data is supplied from the external circuit to said data reception circuit in a plurality of channels, and said battery charging device or said portable information terminal has a channel selection circuit for selecting one of said plurality of channels.

4. A battery charging device comprising:

a charging terminal for connection to a portable information terminal powered by a secondary battery;

a data reception circuit for receiving data supplied by data broadcasting or data supplied via a network; and a reception controller for controlling said data reception circuit to receive data supplied when said portable information terminal is connected to said charging terminal.

5. A battery charging device according to claim 4, wherein the data is supplied from the external circuit to said data reception circuit in a plurality of channels, further comprising a channel selection circuit for selecting one of said plurality of channels.

6. A portable information terminal having a secondary battery, which is connectable to a battery charging device having a data reception circuit for receiving data supplied by data broadcasting or data supplied via a network, comprising:

a memory for storing data; and an external interface for introducing the data;

the arrangement being such that when said portable information terminal is connected to said battery charging device to charge said secondary battery, data received by said data reception circuit is stored into said memory via said external interface.

7. A portable information terminal according to claim 6, wherein the data is supplied from the external circuit to said data reception circuit in a plurality of channels, and said portable information terminal has a channel selection circuit for selecting one of said plurality of channels.

8. A portable information terminal according to claim 6, further comprising:

a display unit for displaying the data stored in said memory.

9. A transmission and reception system having a battery charging device and a portable information terminal, said battery charging device comprising:

a data transmission and reception circuit for receiving and transmitting data between said battery charging device and a data broadcasting station or a network; and a first memory, said portable information terminal comprising:

a second battery, an external interface, and a second memory;

the arrangement being such that when said portable information terminal and said battery charging device are connected to each other, said secondary battery is charged by said battery charging device, and data received from the data broadcasting station or the network by said data transmission and reception circuit is stored into said second memory via said external interface, and when said portable information terminal and said battery charging device are connected to each other, data read from at least one of said first memory and said second memory is transmitted via said data transmission and reception circuit to the data broadcasting station or the network.

10. A transmission and reception system according to claim 9, wherein said portable information terminal has a display unit for displaying the data stored in said second memory.

11. A transmission and reception system according to claim 9, wherein the data is supplied from the external circuit in a plurality of channels, and said battery charging device or said portable information terminal has a channel selection circuit for selecting one of said plurality of channels.

12. A battery charging device comprising:

a charging terminal for connection to a portable information terminal powered by a secondary battery;

a data transmission and reception circuit for transmitting and receiving data between said battery charging device and a data broadcasting station or a network; and a transmission and reception controller for controlling said data transmission and reception circuit to receive data and transmit data between said battery charging device and the data broadcasting station or the network when said portable information terminal is connected to said charging terminal.

13. A battery charging device according to claim 12, wherein the data is supplied from the external circuit to said data reception circuit in a plurality of channels, and said battery charging device or said portable information terminal has a channel selection circuit for selecting one of said plurality of channels.

* * * * *